United States Patent [19]

Flanigan

[11] Patent Number: 4,909,522
[45] Date of Patent: Mar. 20, 1990

[54] NON-MECHANICAL BICYCLE SEAT ATTACHMENT FOR THRUST SUPPORT

[76] Inventor: Rod L. Flanigan, 2904 Teton Dr., Rockford, Ill. 61109

[21] Appl. No.: 312,950

[22] Filed: Feb. 21, 1989

[51] Int. Cl.⁴ .................................................. B62J 1/28
[52] U.S. Cl. .................................... 297/195; 297/214; 297/DIG. 9
[58] Field of Search ............... 297/195, 214, 354, 443, 297/DIG. 9

[56] References Cited

U.S. PATENT DOCUMENTS

| 2,307,709 | 1/1943 | Ooton | 297/DIG. 9 X |
| 2,966,938 | 1/1961 | Ooton | 297/DIG. 9 X |
| 3,588,171 | 6/1971 | Rich, Jr. | 297/214 X |

FOREIGN PATENT DOCUMENTS

| 1027919 | 5/1953 | France | 297/DIG. 9 |
| 274989 | 8/1927 | United Kingdom | 297/DIG. 9 |
| 715560 | 9/1954 | United Kingdom | 297/DIG. 9 |

Primary Examiner—Peter R. Brown

[57] ABSTRACT

A device which will slide over a conventional bicycle seat from the narrow leading-end to the wider trailing-end, requiring no mechanical tools for attachment. Once in position, the device offers a comfortable means of lower back/lumbar support to the bicycle rider, while also providing an effective and efficient means of thrust support by which the bicycle rider may press against while his legs pedal the bicycle, thus enabling more efficient use of the riders' energy.

3 Claims, 1 Drawing Sheet

NON-MECHANICAL BICYCLE SEAT ATTACHMENT FOR THRUST SUPPORT

BACKGROUND OF THE INVENTION

1. Field of the Invention

This invention relates generally to wheeled vehicles, such as bicycles, and more specifically to a novel device that is added to the seat of a bicycle which will give the rider something to push against and which will therefore allow the rider a more confortable ride while also allowing the rider to apply more thrust to the pedals.

Conventional bicycle seats have been molded and designed after racing bicycle seats whose principle aim is efficiency, for both short and long term, high speed riding. Such seats offer virtually no lower back/lumbar support. In have invented a device which will attach to such a bicycle seat that requires no mechanical tools for attachment, thus providing a means for more effective leg thrust, and therefore, more efficient pedaling for the bicycle rider.

2. Description of the Prior Art

There have been devices invented which claim to "increase the comfort and leg thrust of the cyclist", but often times these still are far from effective. Some problems encountered with these known devices are that they require mechanical tools to attach and/or adjust (adding weight and using limited space on a bicycle if carried with the rider), they are not easily attached or removed, their heavy weight usually does not justify using such a device in racing applications where weight is a primary consideration, and they do not conform to the curvature of the riders' lower back/lumbar area.

Existing prior patents which may be pertinent to the present invention, "Non-mechanical Bicycle Seat Attachment for Thrust Support", are as follows:

U.S. Pat. No. 553,722; discloses a back support for bicycle seats employing a rigid support overhanging the seat.

U.S. Pat. No. 592,783; discloses an adjustable backrest for bicycle seats.

U.S. Pat. No. 636,222; discloses a driving back for velocipedes employing telescopic tubes extending from the back to the frame which are independently adjustable.

U.S. Pat. No. 1,190,828; discloses a backrest for bicycles, motorcycles, or similar wheeled vehicles which may be swung downward out of the way for mounting or dismounting purposes.

U.S. Pat. No. 3,970,345; discloses a seat having a backrest that adjusts forward and backward on the frame.

U.S. Pat. No. 4,141,587; discloses a backrest curving upward from the base. A pair of spaced leaf spring intervene between the pad and the seat in the zone where the back and backrest join.

U.S. Pat. No. 4,363,516; discloses a mechanical, tubular backrest for a seat that adjusts forward and backward, and extends upward from the seat base.

U.S. Pat. No. 4,475,770; discloses a backrest for cycle-type seats which is attached by a pivot on the support frame.

British Patent No. 2,408; discloses a backrest employing a tube extending through a saddle pin for adjustment purposes.

French Patent No. 599,972; discloses a backrest mounted between a coil spring interconnecting the seat and frame of the structure.

French Patent No. 1,027,919; discloses a pad forming a backrest for a coil biased seat.

These patents generally show mechanical type devices which attach to a bicycle seat to be used as a backrest; however, none of the known prior art devices offer the new and novel features of the present invention.

SUMMARY OF THE INVENTION

This invention relates to increasing the pedal efficiency of a bicycle rider by attaching a thrust support device to the seat of the bicycle. Therefore, an object of the present invention is to provide a more effective and efficient lower back/lumbar area support attachment for use on the seat of a bicycle.

Another object of the present invention is to provide a device that is easily installed and removed, that will enhance the leg thrust of the bicycle rider.

A further object of this invention is to provide a lightweight device that can be attached to a conventional bicycle seat to provide the rider more effective leg thrust.

A still further object of this invention is to provide a comfortable thrust support device which will conform to the general curvature of the lower back/lumbar area which the rider may confortably press against at the same time he exerts the muscular force of his legs upon the pedals so as to accomplish more effective and efficient leg thrust.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

This invention may be more readily described by reference to the accompanying drawing in which.

DESCRIPTION OF THE PREFERRED EMBODIMENT

Figure 1:
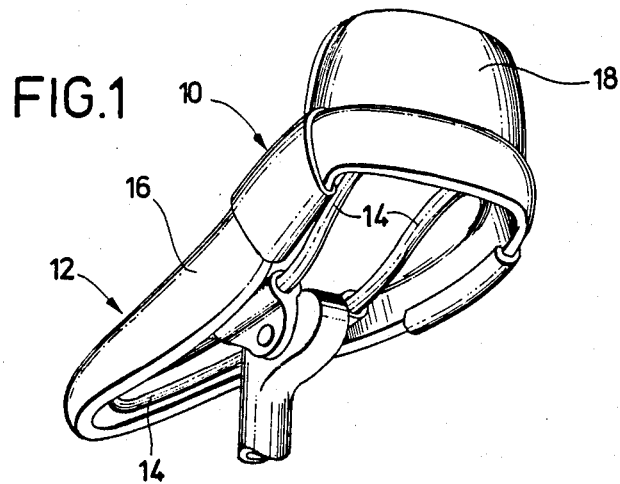
FIG. 1 is a perspective view of a bicycle seat with a thrust support device attached according to the present invention.
Figure 3:
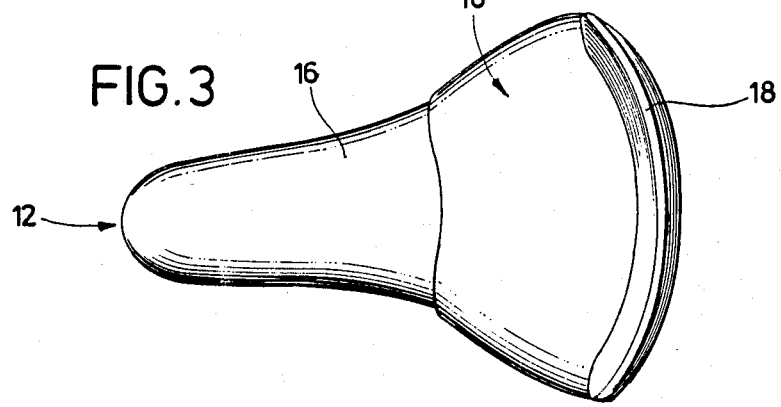
FIG. 3 is a top view of the seat and subject invention shown in FIG. 1.

Referring to FIG. 1 of the drawing, reference numeral 10 indicates in general the present invention. The conventional bicycle seat, 12, normally has no form of thrust support device or lumbar support, and has a narrow leading-edge portion which allows for free leg movement for the rider, ref. FIG. 3. The seat frame 14 is covered by a rigid seat cover 16 which gradually flares wider towards the trailing end of the seat 12 as shown in FIG. 3.

In accordance with the invention herein described, a thrust support/lumbar support device 10 is attached to this conventional bicycle seat 12 by simply sliding it over the seat cover 16 from the narrow leading-end to the wider trailing-end.

This thrust support device 10 is constructed in such a manner that when installed properly it cannot possibly be "pushed" off the trailing-end of the seat cover 16 by the thrust of the bicycle rider. The inside dimensions of the thrust support device, those surfaces that will mate to the outer surfaces of the seat cover 16, are slightly smaller than that of the outer seat cover 16, thus allowing a tight, interference-type fit.

Figure 2:
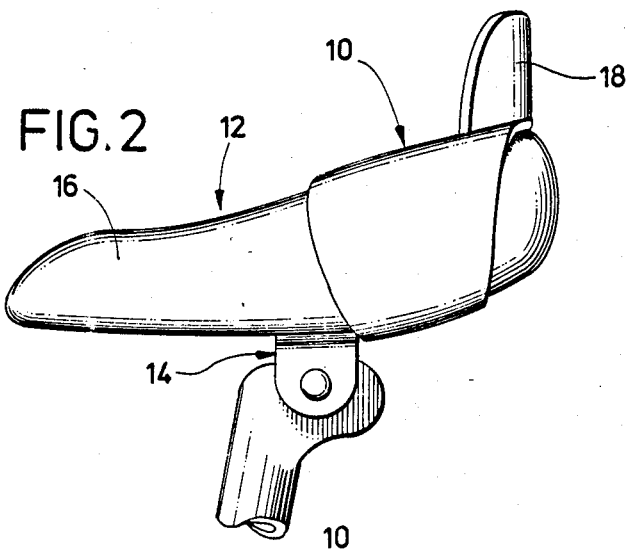
FIG. 2 is a side elevation view of the seat and subject invention of FIG. 1.

FIG. 2 of the drawing discloses the thrust support 10 in its final position on the seat cover 16. The sides of the thrust support device 10 extend downwardly over the sides of the seat cover 16; the fit is secured by the U-shaped ends of the thrust support snapping over the edge of the seat cover 16, as shown in FIG. 1.

The subject invention can be constructed of a lightweight material which will allow it to be molded to the same contour of the seat cover 16. At the same time, the portion of the invention that provides the actual "thrust support" 18 can be molded into the same piece as that which slides over the seat cover 16 to enable a one-piece construction, thus allowing easier installation, removal, and storage. This "thrust support" 18, which extends upwardly from the seat, can also be molded to the curvature of the riders lower back/lumbar area, thus providing a more comfortable support.

The conventionally equipped cyclist is limited to a thrust effectiveness developed by the ability of his arms, hand grip on the handle bars, and body weight to counter or resist the thrust of his legs against the pedals. This limitation can be reduced by the installation of some type of thrust support of which this invention offers. Ease of installation and removal, along with comfort and overall weight are also important considerations in many applications, such as racing cyclists.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A thrust support/lumbar support device for attachment to a conventional bicycle seat having a narrow leading end and a flared wider trailing end comprising: a device that conforms to the general physical compound contours of a seat cover which is formed as a substantially planar one-piece member having a genrally inverted U-shaped cross section from a front edge to a rear edge thereof, having resilient "snap-on" edges with inwardly turned lip portion on lowermost end of each leg such that said device will slide easily over a conventional cycle seat from the narrow leading-end the the flared wider trailing-end; which support device covers a substantial portion of the flared wider trailing-end of the seat and incorporated into its rearward edge has an upwardly extending portion forming a back rest and/or thrust support that is formed in the shape of a concave arc to match that of the lower back/lumbar area of the person in the bicycle seat; wherein said support is non-mechanical allowing the installation or removal of said support without the aid of any special tools or lengthy installation or removal time.

2. A device as set forth in claim 1, wherein said support is padded with a material that will conform to the compound curvatures of each rider for the comfort of the rider.

3. A thrust support device as set forth in claim 1, wherein the inwardly turned lip portion causes said support to snap onto the seat thus providing fixed engagement.

* * * * *